(12) United States Patent
Morisaki et al.

(10) Patent No.: US 10,202,906 B2
(45) Date of Patent: Feb. 12, 2019

(54) TWO-SHAFT GAS TURBINE

(71) Applicant: Hitachi, Ltd., Chiyoda-ku, Tokyo (JP)

(72) Inventors: Tetsuro Morisaki, Tokyo (JP); Naohiro Kusumi, Tokyo (JP); Noriaki Hino, Tokyo (JP); Tomomichi Ito, Tokyo (JP); Kazuo Takahashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 923 days.

(21) Appl. No.: 14/155,813

(22) Filed: Jan. 15, 2014

(65) Prior Publication Data

US 2014/0216047 A1 Aug. 7, 2014

(30) Foreign Application Priority Data

Feb. 1, 2013 (JP) ................................. 2013-018016

(51) Int. Cl.
*F02C 9/48* (2006.01)
*F02C 9/56* (2006.01)
(Continued)

(52) U.S. Cl.
CPC .................. *F02C 9/56* (2013.01); *F01D 5/06* (2013.01); *F01D 13/003* (2013.01); *F02C 3/113* (2013.01);
(Continued)

(58) Field of Classification Search
CPC .. F02C 7/268; F02C 7/275; F02C 7/32; F02C 9/28; F02C 9/34; F02C 9/48; F02C 9/50;
(Continued)

(56) References Cited

U.S. PATENT DOCUMENTS

| 4,147,035 A | * | 4/1979 | Moore | ...................... | F02C 9/42 |
| | | | | | 60/711 |
| 5,189,620 A | * | 2/1993 | Parsons | .................... | G05B 7/02 |
| | | | | | 318/609 |

(Continued)

FOREIGN PATENT DOCUMENTS

| EP | 2 211 112 A2 | 7/2010 |
| JP | 2007-505261 A | 3/2007 |

OTHER PUBLICATIONS

Extended European Search Report issued in counterpart European Application No. 14151749.0 dated Jul. 24, 2017 (10 pages).

*Primary Examiner* — Gerald L Sung
*Assistant Examiner* — Marc Amar
(74) *Attorney, Agent, or Firm* — Crowell & Moring LLP (57) ABSTRACT

A two-shaft gas turbine having high operability is provided. The two-shaft gas turbine includes: a gas generator having a compressor, a combustor and a high pressure turbine; a power turbine having a low pressure turbine; a load connected to the power turbine; a motor/generator capable of rotatably driving the gas generator and capable of extracting power from the gas generator; electric equipment controlling the rotational driving and the power extraction by delivering electric power between the electric equipment and the motor/generator; and a control device controlling the electric equipment, wherein the combustor has a plurality of combustion regions to which a fuel is supplied through fuel adjustment means which are independent from each other, and the control device controls a delivery amount of the electric power delivered by the electric equipment corresponding to the number of combustion regions to which the fuel is supplied.

3 Claims, 5 Drawing Sheets

(51) Int. Cl.
| | |
|---|---|
| *F02C 7/268* | (2006.01) |
| *F02C 7/32* | (2006.01) |
| *F02C 9/50* | (2006.01) |
| *F02C 9/34* | (2006.01) |
| *F23R 3/34* | (2006.01) |
| *F02C 9/54* | (2006.01) |
| *F01D 5/06* | (2006.01) |
| *F01D 13/00* | (2006.01) |
| *F02C 3/113* | (2006.01) |
| *F02C 7/275* | (2006.01) |
| *F02C 7/36* | (2006.01) |
| *F02C 9/28* | (2006.01) |
| *F02C 9/32* | (2006.01) |
| *F03D 15/00* | (2016.01) |

(52) U.S. Cl.
CPC .............. *F02C 7/268* (2013.01); *F02C 7/275* (2013.01); *F02C 7/32* (2013.01); *F02C 7/36* (2013.01); *F02C 9/28* (2013.01); *F02C 9/32* (2013.01); *F02C 9/34* (2013.01); *F02C 9/48* (2013.01); *F02C 9/50* (2013.01); *F02C 9/54* (2013.01); *F03D 15/00* (2016.05); *F23R 3/34* (2013.01); *F23R 3/343* (2013.01); *F23R 3/346* (2013.01); *Y02E 10/72* (2013.01)

(58) Field of Classification Search
CPC ...... F02C 9/54; F02C 9/56; F23R 3/34; F23R 3/343; F23R 3/346
See application file for complete search history.

(56) References Cited

U.S. PATENT DOCUMENTS

| | | | | |
|---|---|---|---|---|
| 5,402,634 | A * | 4/1995 | Marshall | F02C 7/232 60/734 |
| 5,465,570 | A * | 11/1995 | Szillat | F02C 7/26 60/39.281 |
| 7,513,120 | B2 * | 4/2009 | Kupratis | F01D 15/10 60/39.24 |
| 8,201,414 | B2 * | 6/2012 | Haehner | F01D 15/08 60/788 |
| 2002/0033014 | A1 * | 3/2002 | Endo | F02C 9/34 60/39.281 |
| 2002/0148226 | A1 * | 10/2002 | Kendall | F23D 14/16 60/746 |
| 2005/0056021 | A1 * | 3/2005 | Belokon | F02C 3/113 60/772 |
| 2006/0283206 | A1 * | 12/2006 | Rasmussen | F01D 15/005 62/619 |
| 2010/0058731 | A1 | 3/2010 | Haehner et al. | |
| 2010/0180604 | A1 * | 7/2010 | Kawai | F23N 5/184 60/778 |
| 2011/0167833 | A1 | 7/2011 | Kawai et al. | |
| 2012/0000204 | A1 | 1/2012 | Kesseli et al. | |
| 2012/0017600 | A1 * | 1/2012 | Saito | F02C 9/263 60/773 |
| 2012/0017601 | A1 * | 1/2012 | Eroglu | F02C 6/003 60/776 |
| 2014/0165581 | A1 * | 6/2014 | Terry | F02C 9/00 60/772 |

* cited by examiner

TWO-SHAFT GAS TURBINE

BACKGROUND OF THE INVENTION

1. Field of the Invention

The present invention relates to a two-shaft gas turbine.

2. Description of the Related Art

As a background art in this technical field, there has been known a technique disclosed in JP-T-2007-505261 (patent literature 1). In this publication, there is the description "a power generation system is driven by a multi-shaft gas turbine engine including at least a first spool and a second spool. The first spool includes a turbine and a compressor which are mounted on the first shaft, and the second spool includes at least a turbine which is mounted on a second shaft which is not mechanically connected to the first shaft. A main generator is connected to one of the spools, and an auxiliary generator/motor is also connected to one spool. An operation of the engine is controlled using a speed control of the respective generators. The auxiliary generator/motor can be operated in a generation mode where power is extracted from the spool or in a motor mode where power is supplied to the spool" (see Abstract).

SUMMARY OF THE INVENTION

Recently, the utilization of renewable energy has been rapidly spreading. When the utilization of renewable energy spreads so that a change in electric power output is increased, there arises a possibility that a power system becomes unstable. As a means which stabilizes a power system by attenuating a change in electric power output, a gas turbine has been attracting attention due to a quick start-up speed and a high rate of change in an amount of power generation.

Under such circumstances, a gas turbine is required to satisfy higher operability, that is, a quicker start-up speed, a higher rate of change in an amount of power generation, a measure to cope with a change in load which occurs at high frequency, and a wide operation load zone.

The above-mentioned patent literature 1 discloses a multi-shaft turbine generator system and a control method. For example, the patent literature 1 discloses a technique where a speed of the first spool is controlled by the generator/motor (electric equipment) mounted on the first spool thus adjusting a state of an engine.

However, patent literature 1 fails to refer to a technique necessary for acquiring high operability including the above-mentioned quick start-up, high rate of change in an amount of power generation, highly frequent change in load, a wide operation load zone or the like which are listed above.

Accordingly, it is an object of the present invention to provide a two-shaft gas turbine having high operability. For example, the present invention provides a two-shaft gas turbine which can make a combustion switching load differ between at the time of increasing a load and at the time of lowering a load thus lowering the number of times that a combustion region is changed over at the time of changing a load at high frequency.

To overcome the above-mentioned drawbacks, according to one aspect of the present invention, there is provided a two-shaft gas turbine which includes: a gas generator including a compressor which compresses air, a combustor which adds a fuel to compressed air obtained by compressing air by the compressor, and combusts a fuel-air mixture thus generating a combustion gas, and a high pressure turbine which is rotatably driven by the combustion gas; a power turbine which has a low pressure turbine rotatably driven by the combustion gas which drives the high pressure turbine; a load which is connected to the power turbine; a motor/generator which is capable of rotatably driving the gas generator and is capable of extracting power from the gas generator; electric equipment which controls the rotational driving and the power extraction by delivering electric power between the electric equipment and the motor/generator; and a control device which controls the electric equipment, wherein the combustor has a plurality of combustion regions to which a fuel is supplied through fuel adjustment means which are independent from each other, and the control device controls a delivery amount of the electric power delivered by the electric equipment corresponding to the number of combustion regions to which the fuel is supplied.

According to the present invention, it is possible to provide a two-shaft gas turbine having high operability. Other objects, constitutions and advantageous effects will become apparent from the explanation of the following embodiments.

DESCRIPTION OF THE PREFERRED EMBODIMENTS

Hereinafter, embodiments are explained in conjunction with drawings.

Figure 6:
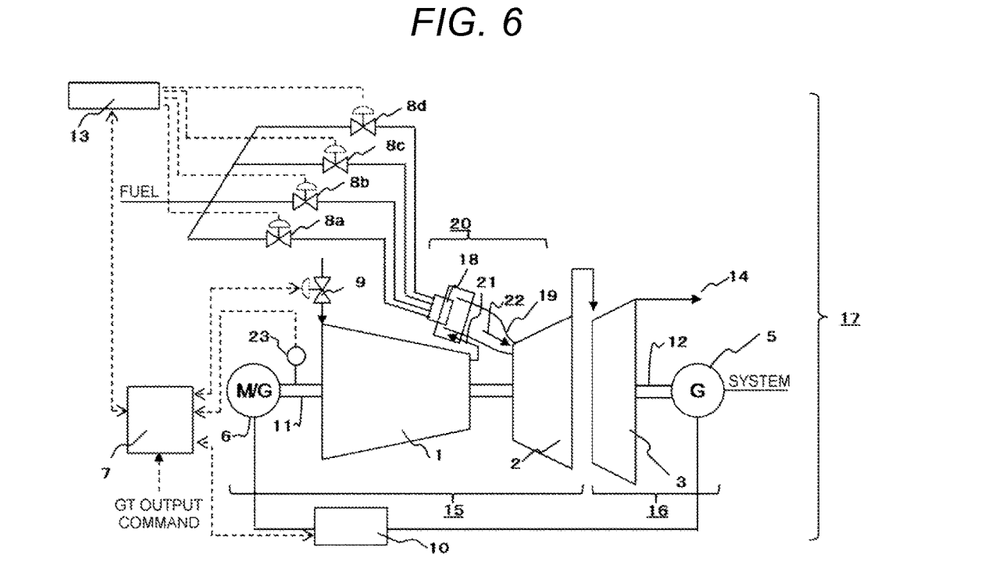
FIG. 6 is a view showing an example of the constitution of a two-shaft gas turbine to which the present invention is applied.

Firstly, one example of the constitution of a two-shaft gas turbine to which the present invention is applicable is explained in conjunction with FIG. 6.

A two-shaft gas turbine 17 includes a gas generator 15, a power turbine arrangement 16, a GT control device 7, and a fuel valve control device 13.

The power turbine arrangement 16 includes a low-pressure turbine 3, a low-pressure turbine shaft 12, and a load 5. In this embodiment, the explanation is made by taking, as an example, a case where a generator is employed as the load 5.

In a case where the two-shaft gas turbine 17 is used for power generation, to set electric power frequency at an approximately fixed value, the power turbine arrangement 16 is rotated at an approximately fixed rotational speed so as to drive the load 5 at an approximately fixed rotational speed. Electric power generated by the load 5 is transmitted to electric power consumers through electric power cables.

The gas generator 15 includes a compressor 1, a combustor 20, a high-pressure turbine 2, a motor/generator 6, and a gas generator shaft 11.

The gas generator 15 has the structure where the gas generator 15 is mechanically separated from the power turbine arrangement 16. Accordingly, the gas generator 15 can be rotatably driven at a rotational speed different from a rotational speed of the low-pressure turbine while maintaining electric power frequency at a fixed value.

Due to such a technical feature, generally, the two-shaft gas turbine is more advantageous than a one-shaft gas turbine with respect to the following points. Firstly, it becomes unnecessary to provide a decelerator between the generator and the power turbine. Even in the case where the decelerator is provided, it is sufficient to provide a decelerator having a small speed reduction ratio and hence, the reliability of the turbine can be enhanced, and the reduction of cost can be realized. Another advantageous point is that, by lowering a rotational speed of the compressor 1 when the gas turbine is subjected to a partial load, the flow of a gas in the compressor 1 can be brought into a more suitable state thus giving rise to a possibility that the operation efficiency of the compressor 1 is enhanced.

Such advantageous effects can be acquired by adopting the constitution where a rotational speed of the power turbine arrangement 16 can be maintained at a low rotational speed corresponding to system frequency while maintaining a rotational speed of the gas generator 15 at a high rotational speed suitable for the performance of the gas generator 15.

The compressor 1 sucks atmospheric air and generates compressed air 21 by compressing the atmospheric air. Further, an IGV (Inlet Guide Vane) 9 is mounted on a suction port of the compressor 1. The IGV 9 changes an area of opening of the compressor 1 along with the rotation thereof. By changing the area of the opening of the compressor 1, an amount of air which flows into the compressor 1 can be changed.

An amount of air which flows into the compressor 1 can be also adjusted by a rotational speed of the gas generator 15.

The combustor 20 includes a premix combustion burner 18 and a combustor liner 19. Also in this embodiment, the case is exemplified where fuel is supplied to the premix combustion burner 18 using four parallel systems having four fuel flow rate control valves 8a to 8d respectively.

In the combustor 20, the compressed air 21 which flows out from the compressor 1 and a fuel are mixed and burnt in the premix combustion burner 18 thus producing a combustion gas 22 having a high temperature and a high pressure. The combustion gas 22 is guided to the high pressure turbine 2 through the combustor liner 19.

The combustor liner 19 is a flow path through which the combustion gas 22 passes initially and hence, a temperature of the combustion liner 19 is liable to become extremely high. Accordingly, the combustor liner 19 is used in a state where the combustor 19 is cooled so that a temperature of the combustor liner 19 becomes an allowable temperature or below, for example.

The high pressure turbine 2 obtains a rotational force from energy which the combustion gas 22 of a high temperature and a high pressure possesses. The rotational force is transmitted to the compressor 1 through the gas generator shaft 11 and rotatably drives the compressor 1.

The combustion gas 22 flows into the low pressure turbine 3 after a part of energy of the combustion gas 22 is extracted by the high pressure turbine 2. The low pressure turbine 3 obtains a rotational force from energy of the combustion gas 22, and transmits the rotational force to the load 5 through the low pressure turbine shaft 12 and rotatably drives the load 5. The combustion gas 22 which passes through the low pressure turbine is discharged as an exhaust gas 14.

An output of the load 5 can be controlled by adjusting a flow rate of fuel. To be more specific, there may be a case where the two-shaft gas turbine has the following constitution in order to adjust the flow rate of fuel.

The GT control device 7 reads a fuel flow rate set value from a numerical value array stored in an internal memory by reference to an input value of a GT output command and a GT operation state value obtained by respective detectors (not shown in the drawing), for example, and transmits the read fuel flow rate set value to the fuel valve control device 13.

The fuel valve control device 13 reads the numerical value array stored in the internal memory, for example, based on the received fuel flow rate set value, and transmits fuel flow rate control valve opening set values to fuel flow rate control valves 8a to 8d.

The fuel flow rate control valves 8a to 8d change the openings thereof based on the opening set values thus changing a flow rate of fuel supplied to the premix combustion burner 18. In the premix combustion burner 18, the compressed air 21 and fuel are mixed with each other thus producing the combustion gas 22 having a temperature and a pressure corresponding to a flow rate of the compression air 21 and a flow rate of fuel. The combustion gas 22 supplies rotational drive energy to the high pressure turbine 2 corresponding to the temperature and the pressure of the combustion gas 22 and, thereafter, rotatably drives the low pressure turbine 3 with residual energy.

By setting the above-mentioned fuel flow rate set value based on a result of experiment performed in advance or a result of designing performed in advance such that an energy collected from the combustion gas 22 by the low pressure turbine 3 and an energy which the load 5 consumes balance each other out, the low pressure turbine 3 and the load 5 can continue the rotation at an approximately fixed rotational speed corresponding to electric power frequency of the system.

The two-shaft gas turbine may be configured such that the GT control device 7 reads an output from a rotational speed detector (not shown in the drawing) of the power turbine arrangement 16, calculates a rotational speed of the power turbine arrangement 16, and performs a feedback control using the difference between the rotational speed of the power turbine arrangement 16 and a rotational speed set value.

Here, a balance adjustment control is simultaneously performed such that energy collected by the high pressure turbine 2 and energy consumed by the compressor 1 become equal to each other.

As a technique for performing such a balance adjustment control, the changing of a rotational speed of the gas generator or the changing of a flow rate of air sucked into the compressor by the adjustment of opening of the IGV 9 can be specified. To be more specific, the technique having the following constitution may be adopted.

The GT control device 7 receives inputting of a GT operation state including a magnitude of a load or the like, and reads a desired rotational speed of the gas generator corresponding to the GT operation state from a numerical value array stored in the internal memory of the GT control device 7 or the like, for example. The GT control device 7 also receives a rotational speed signal which a gas generator rotational speed detection device 23 transmits, calculates a rotational speed of the gas generator, and then calculates the difference between the calculated rotational speed of the gas generator and a desired rotational speed of the gas generator. The GT control device 7 controls a rotational speed of the gas generator 15 by changing the opening of the IGV 9 using a transfer function or the like based on the difference thus adjusting a flow rate of air sucked into the compressor.

For example, when a rotational speed of the gas generator 15 is higher than a set value, by increasing the opening of the IGV 9 thus increasing a flow rate of air sucked into the compressor, power consumed by the compressor 1 is increased whereby the rotational speed is lowered. Contrariwise, by decreasing the opening of the IGV 9, a rotational speed of the gas generator 15 can be increased.

Alternatively, the GT control device 7 may be configured such that, the GT control device 7 receives a GT operation state including a magnitude of a load or the like, reads a desired opening set value of the IGV 9 corresponding to the GT operation state from the numerical value array stored in the internal memory of the GT control device 7, and changes the opening of the IGV 9, for example.

The two-shaft gas turbine 17 having the above-mentioned constitution exhibits the following behavior.

The GT control device 7 supplies required fuel to the combustor 20 corresponding to required power for the load 5 thus creating a balance between the required power for the load 5 and energy collected by the low pressure turbine 3. Due to such an operation, a rotational speed of the power turbine arrangement 16 is controlled to an approximately fixed value. At this point of time, the GT control device 7 also controls the opening of the IGV 9 such that a rotational speed of the gas generator 15 becomes a desired value by balancing energy collected by the high pressure turbine 2 with energy necessary for driving the compressor 1.

In this manner, a desired rotational speed of the gas generator is decided corresponding to a magnitude of the load, and the opening of the IGV 9 is also decided corresponding to the desired rotational speed of the gas generator 15. A flow rate of air sucked into the compressor is controlled based on a rotational speed of the gas generator 15 and the opening of the IGV 9 and hence, as a result, a flow rate of air sucked into the compressor is decided corresponding to a magnitude of the load.

However, an amount of air sucked into the compressor changes depending also on a change in temperature of atmospheric air, a change in humidity of atmospheric air, a change in atmospheric pressure, a change with time in the compressor and the like and hence, there may be a case where an amount of air sucked into the compressor corresponding to a magnitude of the load also changes within a range where these factors change. Further, a rotational speed of the gas generator 15 can be changed within an allowable rotational speed range which is decided based on the performance, the reliability and the like of the compressor 1 and hence, an amount of air sucked into the compressor corresponding to a magnitude of the load can be changed within a range where these factors change.

The two-shaft gas turbine 17 according to each embodiment of the present invention is configured to include electric equipment 10 and the motor/generator 6 as a technique for controlling a rotational speed of the gas generator. When the load 5 is a generator, for example, the electric equipment 10 may be electrically connected to an electric power output of the generator. Further, when the load 5 is a mechanical load, the electric equipment 10 may be electrically connected to an electric power system.

The electric equipment 10 delivers electric power with the motor/generator 6 connected to the gas generator 5 in response to a command from the GT control device 7.

When electric power is supplied to the gas generator 15 from the electric equipment 10 and the motor/generator 6 is operated in a motor mode, the gas generator 15 obtains energy. By supplying energy to the gas generator 15, for example, an amount of air sucked into the compressor can be increased by increasing the opening of the IGV 9 while maintaining a rotational speed of the gas generator 15 at a fixed value. It is also possible to adopt a technique where an amount of air sucked into the compressor is increased by increasing a rotational speed of the gas generator without changing the opening of the IGV 9. It is also possible to adopt a technique where a rotational speed and the opening of the IGV 9 are increased simultaneously.

On the other hand, when electric power is extracted to the power turbine arrangement 16 from the electric equipment 10 and the motor/generator 6 is operated in a generator mode, energy of the gas generator 15 is decreased. Due to the decrease of energy of the gas generator 15, for example, an amount of air sucked into the compressor can be decreased by decreasing the opening of the IGV 9 while maintaining a rotational speed of the gas generator 15 at a fixed value. It is also possible to adopt a technique where an amount of air sucked into the compressor is decreased by decreasing a rotational speed of the gas generator 15 without changing the opening of the IGV 9. It is also possible to adopt a technique where a rotational speed and the opening of the IGV 9 are decreased simultaneously.

As described above, by changing the electric power delivery mode between the electric equipment 10 and the motor/generator 6, compared to a two-shaft gas turbine which is not provided with the motor/generator 6, a flow rate of air sucked into the compressor can be largely changed by changing the opening of the IGV while maintaining a desired rotational speed of the gas generator 15 corresponding to a magnitude of the load.

With respect to an output of the load 5 at the time of operating the motor/generator 6, for example, power is necessary when the motor/generator 6 is operated in a motor mode. By taking into account such a condition, the explanation is made hereinafter on the assumption that the output of the load 5 is acquired by subtracting a loss and power of the motor/generator 6 from energy which the power turbine shaft 12 transmits.

Figure 7:
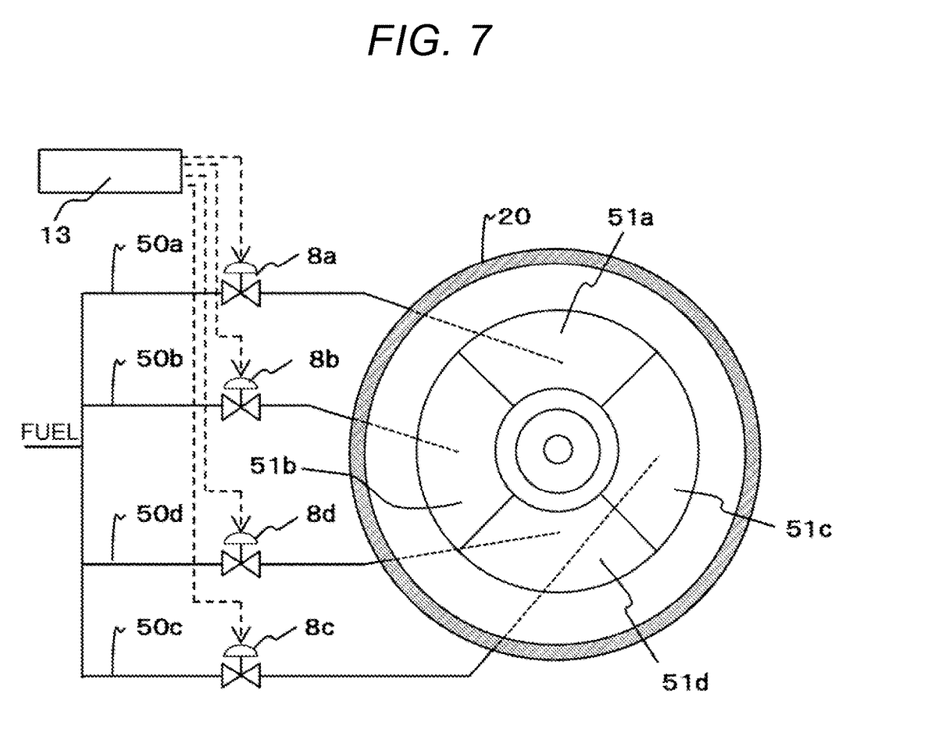
FIG. 7 is a view showing an example of the constitution of a combustor of the two-shaft gas turbine to which the present invention is applied.

FIG. 7 is a view showing one example of the constitution of the combustor 20 of the two-shaft gas turbine according to the embodiment of the present invention.

FIG. 7 is a view where the combustor 20 is viewed from a downstream side in the flow direction of compressed air 22. Flames in the inside of the combustor 20 are formed perpendicular to a surface of paper on which FIG. 7 is drawn, that is, in the direction from a depth side of the surface of the paper to a viewer's side.

The premix combustion burner 18 is partitioned into four combustion regions 51a, 51b, 51c, 51d approximately uniformly. The combustion regions 51a, 51b, 51c, 51d are regions where the premix combustion is performed independently.

Further, the fuel flow rate control valve 8a is provided to a fuel supply line 50a corresponding to the combustion region 51a. In the same manner, the fuel flow rate control valve 8b is provided to a fuel supply line 50b corresponding to the combustion region 51b, the fuel flow rate control valve 8c is provided to a fuel supply line 50c corresponding to the combustion region 51c, and the fuel flow rate control valve 8*d* is provided to a fuel supply line 50*d* corresponding to the combustion region 51*d*.

Due to such a constitution, in the premix combustion burner 18, it is possible to supply fuel to the respective combustion regions 51*a* to 51*d* independently from each other, and it is possible to perform the premix combustion only in the region into which fuel is supplied.

The fuel valve control device 13 receives a fuel flow rate set value, a GT operation state and the like which the GT control device 7 outputs, and operates so as to either increase or decrease the number of combustion regions where the premix combustion is performed. For example, when the load is small, the fuel valve control device 13 transmits an opening signal to the fuel flow rate control valve 8*a* such that the premix combustion is performed only in the combustion region 51*a*, and transmits a signal to other valves such that a flow rate becomes 0. When the load is increased so that a GT operation state exceeds a predetermined threshold value, the fuel valve control device 13 transmits an opening signal also to the fuel flow rate control valve 8*b* such that the premix combustion is additionally performed also in the combustion region 51*b*. Hereinafter, the increase and the decrease of the number of combustion regions where the premix combustion is performed is referred to as "combustion switching".

The above-mentioned preset threshold value can be decided based on experiments and designing performed in advance.

When the number of combustion regions is increased in accordance with combustion switching, the number of burners to which fuel is supplied is increased and hence, a flow rate of fuel per burner is decreased. Accordingly, a fuel-air ratio is lowered.

Contrariwise, when the number of combustion regions is decreased, a flow rate of fuel per burner is increased so that the fuel-air ratio is increased.

When a fuel-air ratio is large, there may be a case where a temperature of a local combustion gas is increased so that the concentration of NOx in the exhaust gas 14 is increased. On the other hand, when a fuel-air ratio is small, there may be a case where the stability of combustion is decreased thus giving rise to problems such as misfire. As described above, there exists a desired range for the fuel-air ratio.

Since a fuel-air ratio can be controlled by combustion switching, it is possible to acquire a desired fuel-air ratio over a wide range of flow rate of fuel. There may be also a case where the combustion switching is performed based on a limit value imposed on a metal temperature of the combustor 20, the concentration of an unburned combustible content of the exhaust gas 14, the concentration of carbon monoxide (CO) or the temperature distribution.

Embodiment 1

In this embodiment, the explanation is made by taking a two-shaft gas turbine having high operability as an example.

Figure 1:
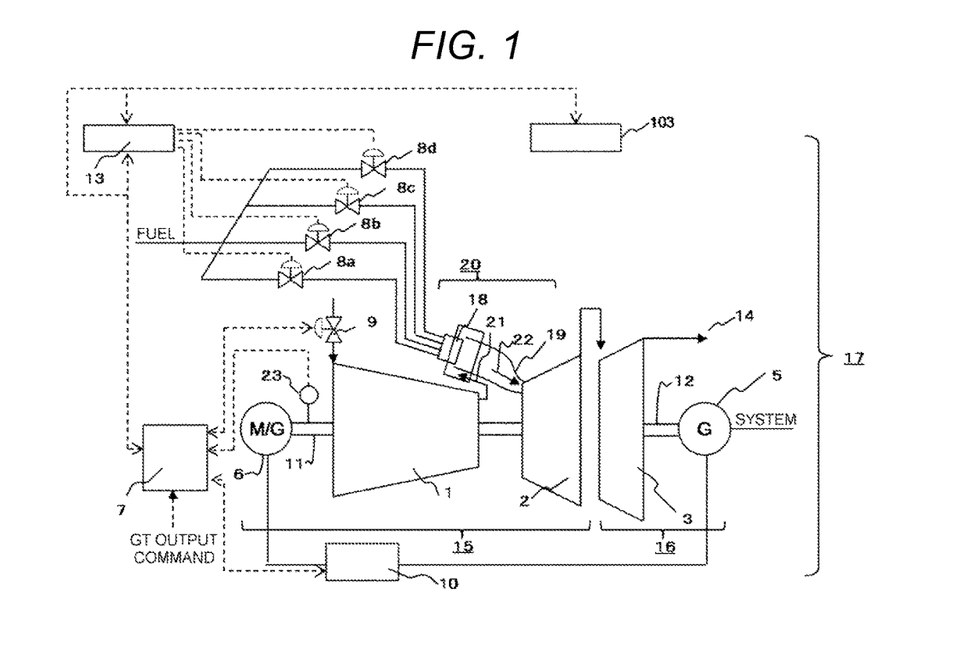
FIG. 1 is a view showing an example of the constitution of a two-shaft gas turbine according to an embodiment 1.

FIG. 1 shows an example of the constitution of the two-shaft gas turbine according to this embodiment.

The two-shaft gas turbine according to this embodiment is characterized by including a motor/generator operation state setting part 103 which has the following functions in addition to the constitutions described above.

The motor/generator operation state setting part 103 reads the number of combustion regions where the combustion is generated from the fuel valve control device 13 at this point of time. Then, the motor/generator operation state setting part 103 reads a magnitude of the load 5 from the GT control device 7. The motor/generator operation state setting part 103 reads an operation command value suitable for the motor/generator 6 from the numerical value array stored in the internal memory, for example, corresponding to the number of combustion regions and a magnitude of the load 5, and transmits an operation command value to the electric equipment 10. The electric equipment 10 receives the operation command value and operates the motor/generator 6 in response to the command value.

The numerical value array stored in the motor/generator operation state setting part 103 can be decided based on a parameter survey performed with respect to a load, a fuel-air ratio, a flow rate of air sucked into the compressor, the opening of the IGV 9, a rotational speed of the gas generator 15 and the like obtained by experiments, designing and analysis performed in advance.

The numerical value array can be also set using a maintenance console of the GT control device 7 (not shown in the drawing).

Figure 2:
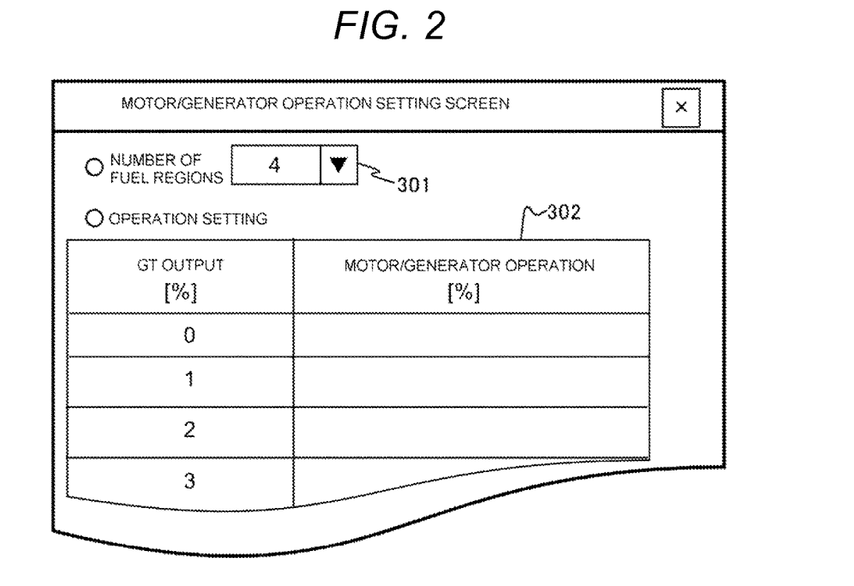
FIG. 2 is a view of a setting screen of the two-shaft gas turbine according to the embodiment 1.

FIG. 2 shows an example of a set value input screen of the maintenance console.

The set value input screen has a combustion region number setting part 301, and a GT output-motor/generator input/output setting part 302. The operation of the motor/generator is set corresponding to the number of combustion regions using the input screen.

The manner of operation of the two-shaft gas turbine having such a constitution is schematically explained as follows.

When a fuel-air ratio is higher than a predetermined value (first value), the motor/generator 6 is operated as a motor. For example, when the fuel-air ratio reaches a value near a combustion switching threshold value upper limit due to the increase in a load and the increase in the number of combustion regions by combustion switching is intended, a motor mode output of the motor/generator 6 is increased thus increasing a flow rate of air sucked into the compressor. Because of such an operation, the fuel-air ratio can be decreased without using the combustion switching and hence, it is possible to increase a combustion switching load. Further, when the load is further increased and the fuel-air ratio reaches the switching threshold value upper limit again at the time of operating the motor/generator 6, the combustion switching is performed.

When the fuel-air ratio is lower than a predetermined value (second value), the motor/generator 6 is operated as a generator. For example, when the fuel-air ratio reaches a value near a switching threshold value lower limit due to the decrease of the load and the decrease of the number of combustion regions by combustion switching is intended, a generator mode input of the motor/generator 6 is increased thus decreasing a flow rate of air sucked into the compressor. Because of such an operation, the fuel-air ratio can be increased without using the combustion switching and hence, it is possible to decrease a combustion switching load. Further, when the load is further decreased and the fuel-air ratio reaches the switching threshold value again at the time of operating the motor/generator 6, the combustion switching is performed.

By using both methods simultaneously or by using either one of these methods alone, the two-shaft gas turbine according to this embodiment can provide a larger hysteresis to a combustion switching load compared to a conventional two-shaft gas turbine.

FIGS. 3A to 3D show an example of an operation pattern of the two-shaft gas turbine according to this embodiment.

In all graphs shown in FIGS. 3A to 3D, a gas turbine output is taken on an axis of abscissas. A flow rate of air sucked into the compressor is taken on an axis of ordinates in the graph of FIG. 3A, a fuel-air ratio is taken on an axis of ordinates in the graph of FIG. 3B, an IGV opening is taken on an axis of ordinates in the graph of FIG. 3C, and an output of the motor/generator which is connected to the gas generator 15 is taken on an axis of ordinates in the graph of FIG. 3D.

FIGS. 3A to 3D also show a case where the operation of the two-shaft gas turbine near a specified combustion switching point is extracted.

Figure 3A:
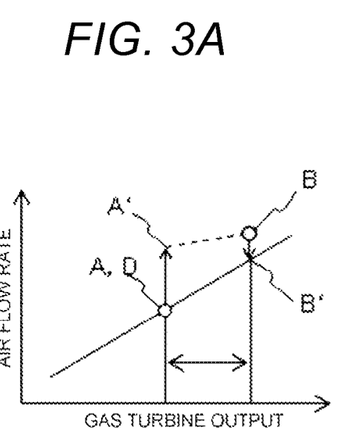
FIGS. 3A to 3D are views showing an example of an operation pattern of the two-shaft gas turbine according to the embodiment 1.
Figure 3B:
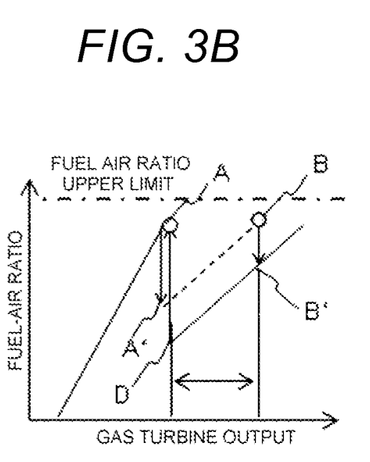
Figure 3C:
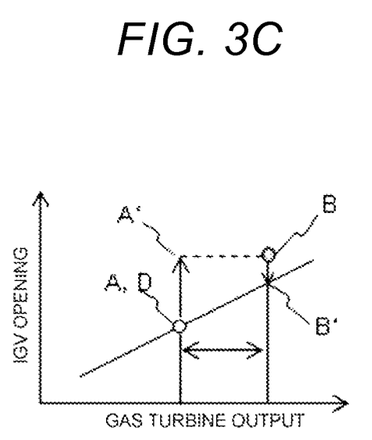
Figure 3D:
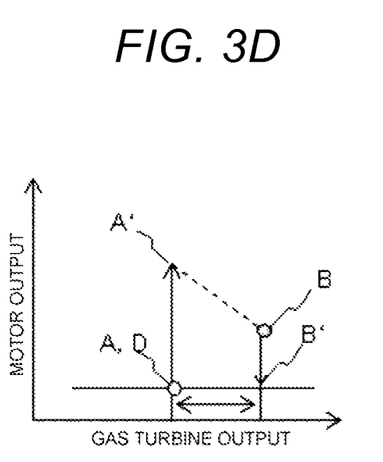

Firstly, as shown in the graph in FIG. 3B, a gas turbine output is increased and an operation state of the gas turbine reaches a point A. The point A indicates an operation state where a fuel-air ratio is near an upper limit thereof and it is necessary to perform the combustion switching with a load near the point A. An output of the motor is increased as shown in the graph in FIG. 3D at this point A so that the operation state is shifted to a point A' from the point A. At this point of time, the control system increases an IGV opening as shown in the graph in FIG. 3C so as to maintain a rotational speed of the gas generator 15. As a result, as shown in the graph in FIG. 3A, a flow rate of air sucked into the compressor is increased from the point A to the point A'.

When the load is further increased, the operation state of the gas turbine moves on an operation line indicated by a broken line in the graphs in FIGS. 3A to 3D and reaches a point B. The fuel-air ratio reaches an upper limit thereof at this point B and hence, the combustion switching is performed. Simultaneously with the combustion switching, the motor output is decreased and the operation state of the gas turbine is shifted to a point B' from the point B. That is, the combustion switching point at the time of increasing the load is the point B.

Contrariwise, when a load is decreased from a high output state, the operation state of the gas turbine moves on an operation line along a solid line and the combustion switching is performed at a point D. Although not exemplified, in the same as the case where the load is increased, the point D is further shifted to a low load side by operating the motor/generator 6 in the generator mode.

The difference in output between the output at the point B and the output at the point D can be set as the hysteresis.

The combustion switching is a useful technique for performing the premix combustion over a wide load range. However, such a technique is accompanied with ignition or misfire and hence, a large temperature change occurs in a combustion gas or the premix combustion burner 18, and the large temperature change generates a thermal stress. Accordingly, when the combustion switching is repeated an excessive number of times, there exists a possibility that the reliability of high temperature parts will be adversely influenced by the combustion switching.

Recently, the generation of electric power using the renewable energy has been attracting attention and the introduction of such a technique is being underway. However, the renewable energy is an electric power source which fluctuates largely. Accordingly, to operate a frequency and a voltage of an electric power system in a stable manner, it is necessary to provide another power source for canceling the fluctuation of the renewable energy.

When a gas turbine is used as a power source for canceling the fluctuation of the renewable energy, the technique has a drawback that frequency of change in load is increased compared to a conventional operation. According to the two-shaft gas turbine of this embodiment, a large hysteresis can be set at a combustion switching point and hence, even under a condition where a change in load is repeated at high frequency, the increase of frequency of combustion switching can be suppressed. Accordingly, it is possible to provide a gas turbine having high reliability and high operability which can cope with the situation where change in load is repeated at high frequency.

There may be a case where a lifetime of the combustor 20 is determined based on thermal fatigue. The fatigue lifetime is determined based on thermal stress and the number of times that application of the thermal stress is repeated. If the number of times of combustion switching, that is, the number of times the stress is applied can be suppressed under a condition of fixed lifetime, it is possible to allow applying of a larger thermal stress to the combustor 20.

The magnitude of stress has the correlation with a change speed of a load, and there is a tendency that the faster the load changes, the larger the stress becomes. In the two-shaft gas turbine of this embodiment, the applying of the larger stress is allowed and hence, a change speed of the load can be further increased.

There may be a case where the gas turbine is operated such that an usual operation range of the gas turbine is limited to a load range where the combustion is allowable in all regions for preventing the gas turbine from receiving thermal shock brought about by the combustion switching, and the combustion switching is performed only in accordance with the starting/stopping sequence. In such a case, according to the two-shaft gas turbine of this embodiment, by operating the motor/generator in a generator mode under a situation that the combustion is performed in all regions and under a situation that a fuel-air ratio is near an allowable lower limit, a flow rate of air sucked into the compressor can be decreased. Accordingly, a fuel-air ratio can be increased and a combustion switching load can be decreased. Due to such an operation, an operation load zone of the two-shaft gas turbine can be widened.

Such advantageous effects can be obtained by the following constitution. That is, the two-shaft gas turbine according to this embodiment includes: the gas generator 15 including the compressor 1 which compresses air, the combustor 20 which adds a fuel to compressed air obtained by compressing air with the compressor 1, and combusts a fuel-air mixture thus generating a combustion gas, and the high pressure turbine 2 which is rotatably driven by the combustion gas; the power turbine arrangement 16 which has the low pressure turbine 3 rotatably driven by the combustion gas 22 which drives the high pressure turbine 2; the load 5 which is connected to the power turbine arrangement 16; the motor/generator 6 which is capable of rotatably driving the gas generator 15 and is capable of extracting power from the gas generator 15; the electric equipment 10 which controls the rotational driving and the power extraction by delivering electric power between the electric equipment 10 and the motor/generator 6; and the control device 7 which controls the electric equipment 10, wherein the combustor 20 has the plurality of combustion regions to which a fuel is supplied through the fuel flow rate control valves 8 which constitute fuel adjustment means which are independent from each other, and the control device 7 controls a delivery amount of the electric power delivered by the electric equipment 10 corresponding to the number of combustion regions to which the fuel is supplied.

The gist of the technique of this embodiment lies in the adjustment of the combustion switching point using the motor/generator 6. Due to such adjustment, the frequency of combustion switching can be decreased by ensuring a hysteresis width, or an operation load zone can be widened. The manner of operation of this embodiment is characterized in that, even when the magnitude of the load is the same, the manner of operation of the motor/generator 6 differs corresponding to the number of combustion regions. It must be understood that the constitution of equipment according to this embodiment is merely one example of control equipment for achieving the manner of operation, and is not intended to limit the technical concept of the present invention.

In this embodiment, although the explanation has been made by taking the case where a fuel-air ratio is used as the criteria for determining the combustion switching point as an example, there may be also a case where, besides the fuel-air ratio, a value which has correlation with a fuel-air ratio such as the NOx/CO/unburned combustible content concentrations, exhaust gas temperature distribution, combustion vibrations or a metal temperature is used as the criteria for determining the combustion switching point.

Further, although the explanation has been made with respect to the case where the manner of operation of the motor/generator 6 is decided based on a numerical value array stored in the inside of the motor/generator operation state setting part 103, the manner of operation of the motor/generator 6 may be decided in such a manner that a fuel-air ratio or the like is directly measured by a sensor, and the manner of operation of the motor/generator 6 is decided based on a functional value which contains a result of the measurement as a variable. With the use of an actually measured value, it is possible to decrease tolerance to be taken into account such as a calculation error or a calculation margin and hence, an operator can grasp the more accurate combustion switching point which contributes to the increase of an operation load zone and the decrease of frequency of combustion switching.

There has been known a technique which predicts an amount of electric power generated using renewable energy. In this case, it may be configured as follows: a prediction value is taken into a load trend prediction data base, the motor/generator operation state setting part 103 reads the prediction value, and the control device 7 adjusts the manner of operation of the motor/generator 6. Alternatively, an input part to which the prediction value is inputted may be configured to receive inputting from the GT operator and an input value is taken into the load trend prediction data base.

For example, the motor/generator operation state setting part 103 analyzes a load prediction value. When it is determined from the result of the analysis that the necessity of increasing the number of the combustion regions by the combustion switching soon arises and the operation of the gas turbine is allowable by the control using the motor/generator 6 even when the number of the combustion regions is increased by the combustion switching at this point of time, the combustion switching is performed as early as possible so that the operation is performed with a low fuel-air ratio. There exists the correlation between a fuel-air ratio and an amount of NOx such that when the fuel-air ratio is low, the amount of NOx is also decreased and hence, an amount of NOx can be decreased by performing the above-mentioned operation.

Embodiment 2

In this embodiment, the explanation is made with respect to an example of a two-shaft gas turbine having high operability which can suppress the increase of the number of times of the combustion switching.

Figure 4:
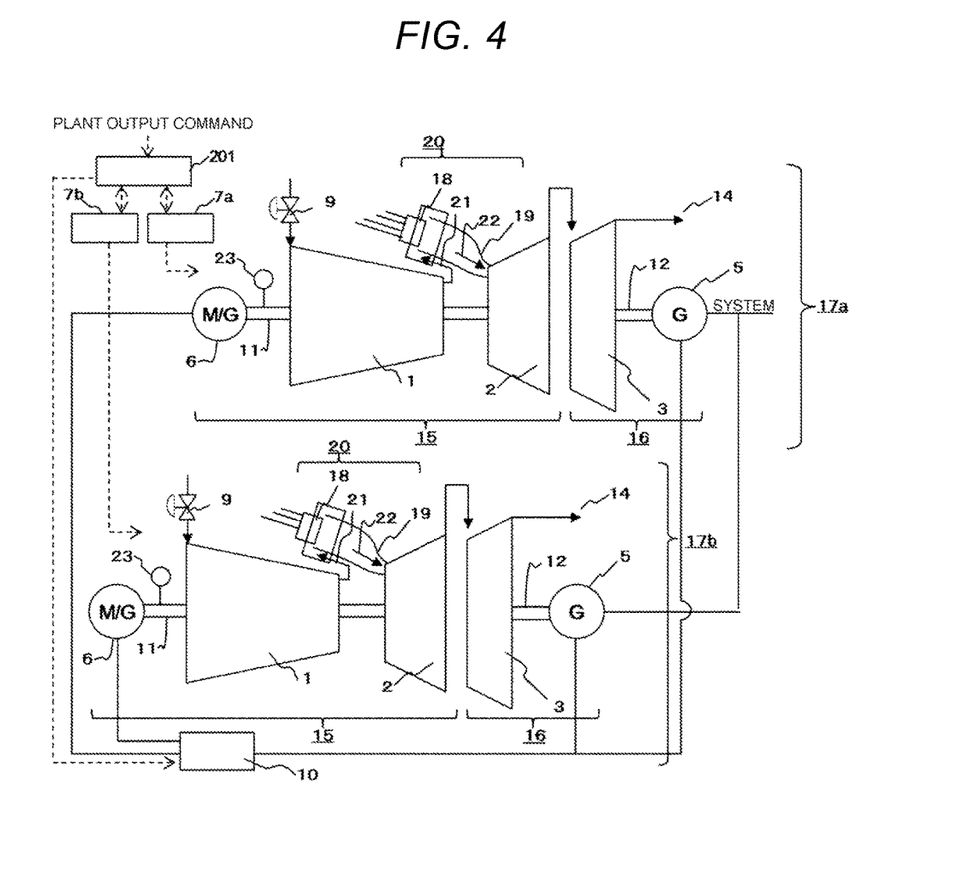
FIG. 4 is a view showing an example of the constitution of a two-shaft gas turbine according to an embodiment 2.

FIG. 4 shows an example of the constitution of the two-shaft gas turbine of this embodiment.

In the two-shaft gas turbine 17 shown in FIG. 4, the explanation of parts having functions identical with the functions of the parts shown in FIG. 1 which are already explained are given the same symbols and the explanation of these parts is omitted.

This embodiment is characterized in that electric equipment 10 is used in common in use by at least two or more two-shaft gas turbines 17.

According to the embodiment 1, there may be a case where the motor/generator 6 is configured to be operated only at combustion switching timing. In such a case, the electric equipment 10 is not always used and hence, by adjusting the use timing of the motor/generator among a plurality of two-shaft gas turbines 17, the electric equipment 10 can be used in common. By enabling the use of the electric equipment 10 in common, an installation cost can be decreased.

As an example of the embodiment, a case where one GT control device is used in common by two two-shaft gas turbines is explained hereinafter.

A plant control device 201 is connected to a GT control device 7a of a two-shaft gas turbine 17a and a GT control device 7b of a two-shaft gas turbine 17b using control lines. Further, the plant control device 201 is also connected to electric equipment 10 using a control line.

The plant control device 201, upon the reception of a plant output command, decides output commands to the GT control devices 7a, 7b such that the two-shaft gas turbines 17a, 17b do not operate the motor/generators 6 simultaneously and transmits the GT output commands to the GT control devices 7a, 7b.

The GT control devices 7a, 7b receive GT output commands, and control the two-shaft gas turbines such that the two-shaft gas turbines perform the substantially same operation as the two-shaft gas turbine described in the embodiment 1.

The electric equipment 10 includes a switch in the inside thereof and, upon the reception of an input from the plant control device 201, is operated so as to switch an output to either one of the two-shaft gas turbines 17a, 17b. Further, the electric equipment 10 receives an output command for the motor/generator from the GT control device 7a or 7b, and transmits electric power corresponding to the output command to the motor/generator 6 of either one of the two-shaft gas turbines 17a, 17b.

To enhance reliability of power generating equipment or the like, there may be a case where redundancy is ensured with respect to the equipment by providing a plurality of same equipments. For example, although one electric equipment 10 is provided for two sets of two-shaft gas turbines in this embodiment, two electric equipments 10 may be installed, and one of two electric equipments 10 may be used as a backup device. Due to such a constitution, the reliability can be further enhanced.

Embodiment 3

In this embodiment, a two-shaft gas turbine having high operability and high performance is explained as an example.

Figure 5:
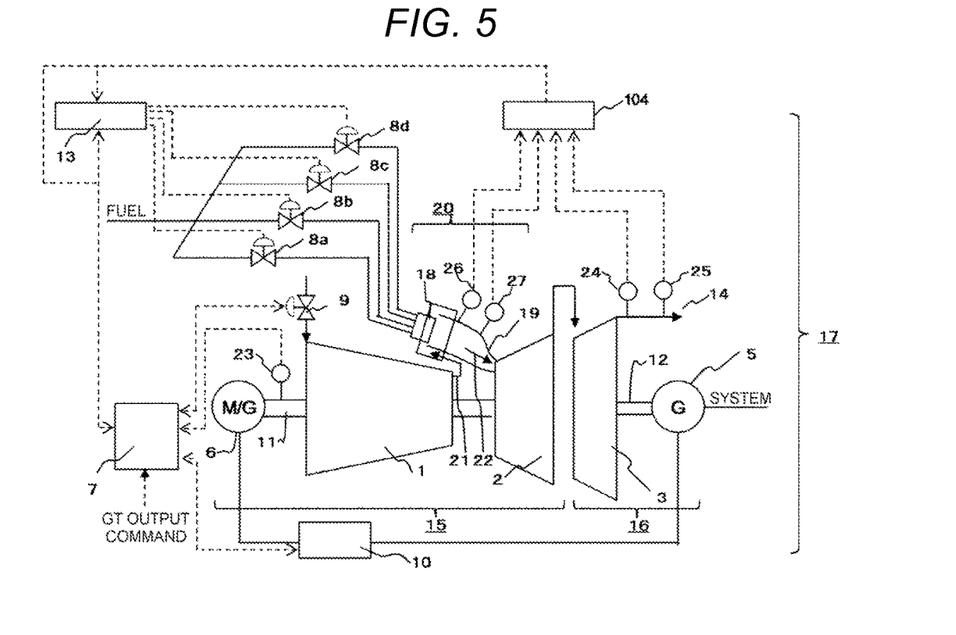
FIG. 5 is a view showing an example of the constitution of a two-shaft gas turbine according to an embodiment 3.

FIG. 5 shows the constitution of the example of the two-shaft gas turbine of this embodiment.

In the two-shaft gas turbine 17 shown in FIG. 5, the explanation of parts having functions identical with the functions of the parts shown in FIG. 1 which are already explained are given the same symbols and the explanation of these parts is omitted.

This embodiment is characterized in that a control system is configured such that the control system includes at least one kind of device selected from a group consisting of a NOx/CO/unburned combustible content concentration detection device 24, an exhaust gas temperature detection device 25, a combustion vibrations detection device 26 and a temperature detection device 27, a management value monitoring part 104 determines tolerance between a detection value and an allowable value, and when the tolerance becomes lower than the reference, a motor generator 6 is operated.

Alternatively, the control system may be configured such that a location where it is predicted that NOx/CO/unburned combustible content concentration, exhaust gas temperature distribution, combustion vibrations or a temperature exceeds a management value based on the result of experiment, designing or the like performed in advance is stored in an internal memory of the management value monitoring part 104, for example, and when an operation state of the two-shaft gas turbine reaches such a location, the motor/generator 6 is operated.

A combustor is designed such that the NOx concentration becomes not more than a reference value, the distribution of combustion gas temperature becomes not more than a reference value, the combustion vibrations are not generated, and a metal temperature becomes not more than a reference value under a gas turbine operation condition within an estimated range.

The NOx/CO/unburned combustible content concentration, the distribution of exhaust gas temperature, the combustion vibrations, and the temperature exhibit large sensitivity also to the difference in composition of fuel in use, a temperature and a humidity of air sucked into the compressor, and a small deviation such as a finished size of a premix combustion burner. Accordingly, there may be a case where a large margin is provided at the time of designing the two-shaft gas turbine to prevent the occurrence of a problem in an actual product. Further, there may be a case where an operation range of a gas turbine body is also set such that the NOx/CO/unburned combustible content concentration, the distribution of exhaust gas temperature, the combustion vibrations, and the temperature respectively become not more than the reference values.

The NOx/CO/unburned combustible content concentration, the distribution of exhaust gas temperature, the combustion vibrations and the temperature are influenced by a flow rate of air sucked into the compressor. By operating the motor/generator 6 thus changing a flow rate of air sucked into the compressor, such influence can be attenuated so that an operation range of the gas turbine can be widened.

For example, when a load cannot be lowered due to the limitation imposed on a NOx value at a partial load, by operating the motor/generator in a motor mode thus increasing a flow rate of air sucked into the compressor, NOx can be decreased. As a result, a load can be further decreased.

For example, when an unburned combustible content or a CO value reaches a limit value due to excessive lowering of a fuel-air ratio in a partial load so that the load cannot be lowered, by operating the motor/generator 6 in a generator mode thus decreasing a flow rate of air sucked into the compressor, an unburned combustible content or CO can be suppressed. As a result, a load can be further decreased.

For example, when a load cannot be lowered due to the limitation imposed on the distribution of exhaust gas temperature, the combustion vibrations or a temperature, by operating the motor/generator 6 either in a motor mode or in a generator mode thus changing a flow rate of air sucked into the compressor and eventually changing a state of flow in the inside of the combustor 20, the occurrence of the above-mentioned phenomenon can be obviated.

Further, according to the constitution of this embodiment, the limitation imposed on the combustor 20 can be alleviated by operating the motor/generator 6 and hence, the limitation imposed at the time of designing the combustor can be alleviated. In general, when the designing is performed such that many limitation matters are satisfied, there is a tendency that the performance is lowered or the cost is pushed up. For example, there is a possibility that the performance is lowered or the cost is pushed up by adopting a combustion nozzle where irregularities of the spatial distribution of a local fuel-air ratio are large, that is, NOx is liable to be generated such that the allowable tolerance in manufacture is decreased, irregularities of a flow rate attributed to a size are suppressed or combustion vibrations are not generated in any range of fuel-air ratio.

Since the limitation on designing which lowers the performance of the combustor or pushes up the cost of the combustor can be alleviated, it is possible to provide the gas turbine to which the more preferred combustor is applied.

The gist of the technique of this embodiment lies in the enlargement of a width of the use of combustor using the motor/generator 6, that is, the reduction of a value used for limiting the use of the combustor such as NOx/CO/unburned combustion content concentration, the distribution of exhaust gas temperature, combustion vibrations or a temperature by adjusting a flow rate of air sucked into the compressor using the motor/generator 6. It should be construed that the constitution of the control equipment according to this embodiment is one example of the control equipment which achieves such a manner of operation, and does not limit the technical concept of the present invention.

The present invention is not limited to the above-mentioned embodiments, and various modifications are included in the present invention. For example, the above-mentioned embodiments are explained in detail for facilitating the understanding of the present invention, and the present invention is not always limited to the embodiments which include all the constitutions explained above. Further, a part of the constitution of one embodiment may be replaced with the constitution of another embodiment. Further, the constitution of another embodiment may be added to the constitution of one embodiment. Still further, with respect to apart of the constitution of each embodiment, the addition, the removal or the replacement of other constitutions are possible.

The above-mentioned respective constitutions, functions, processing parts, processing means and the like may have a part or the whole thereof realized by hardware by designing using an integrated circuit or the like, for example. Alternatively, the above-mentioned respective constitutions, functions and the like may be realized by software by making a processor interpret and execute programs which realize the respective functions.

Further, control lines and information lines are those which are considered necessary for the explanation of the present invention, and do not always indicate all control lines and information lines of the product. It may be safe to say that almost all constitutions are mutually connected with each other in the actual product.

What is claimed is:
1. A two-shaft gas turbine comprising:
a gas generator including a compressor which compresses air, a combustor which adds a fuel to compressed air obtained by compressing air with the compressor, and combusts a fuel-air mixture thus generating a combustion gas, an inlet auide valve that changes an amount of air flowing into the compressor, and a high pressure turbine which is rotatably driven by the combustion gas;

a power turbine arrangement which has a low pressure turbine rotatably driven by the combustion gas which drives the high pressure turbine and a load which is connected to the low pressure turbine;

a motor/generator which is capable of rotatably driving the gas generator and is capable of extracting power from the gas generator;

electric equipment which controls the rotational driving and the power extraction by delivering electric power between the electric equipment and the motor/generator; and a control device programmed to control the inlet guide valve and the electric equipment, wherein the combustor includes a premix combustion burner that is partitioned into four combustion regions to which a fuel is supplied through fuel adjustment means which are independent from each other, and the control device adjusts an opening of the inlet guide valve to balance energy collected by the high pressure turbine with energy necessary for driving the compressor, controls a rotational speed of the gas generator to become a desired value, and increases or decreases a delivery amount of the electric power delivered by the electric equipment when the number of combustion regions to which the fuel is supplied is changed depending on an increase or decrease in the load.

2. The two-shaft gas turbine according to claim 1, wherein the control device includes a load trend prediction data base having load trend prediction information, and the control device controls the delivery amount of electric power delivered by the electric equipment corresponding to the information of the load trend prediction data base.

3. A gas turbine plant having the two-shaft gas turbine according to claim 1, wherein the two-shaft gas turbine is one of a plurality of two-shaft gas turbines, and the electric equipment is used in common by the plurality of two-shaft gas turbines.

* * * * *